United States Patent [19]
Myers

[11] Patent Number: 5,867,585
[45] Date of Patent: Feb. 2, 1999

[54] CURVILINEAR PRESSURE PAD FOR IMPROVED MICR READING AND METHOD

[75] Inventor: Robert Andrew Myers, Cary, N.C.

[73] Assignee: International Business Machines Corporation, Armonk, N.Y.

[21] Appl. No.: 781,633

[22] Filed: Jan. 10, 1997

[51] Int. Cl.$^6$ .................................................... G06K 7/08
[52] U.S. Cl. .......................................... 382/139; 382/320
[58] Field of Search ................................. 382/137, 139, 382/140, 320; 360/2, 130.3; 235/449

[56] References Cited

U.S. PATENT DOCUMENTS

| | | | |
|---|---|---|---|
| 3,801,804 | 4/1974 | Von Glahn et al. | 235/61.11 R |
| 3,898,432 | 8/1975 | Agnew et al. | 235/61.11 D |
| 4,031,359 | 6/1977 | Christou et al. | 235/61.11 D |
| 4,201,978 | 5/1980 | Nally | 340/146.3 C |
| 4,315,246 | 2/1982 | Milford | 340/146.3 D |
| 4,710,837 | 12/1987 | Matsumoto | 360/110 |
| 5,142,427 | 8/1992 | Kogan | 360/130.3 |
| 5,309,302 | 5/1994 | Vollmann | 360/96.1 |

*Primary Examiner*—Andrew W. Jones
*Attorney, Agent, or Firm*—John D. Flynn; Winstead, Sechrest & Minick

[57] ABSTRACT

A reader and pressure pad apparatus is disclosed for urging documents with various physical characteristics to conform to the shape of the reader, increasing the efficiency of the reader. The reader has a curved convex surface with a centrally located read head gap and the pressure pad, an oppositely curved concave surface, which is biased against the read head in order to improve the contact area between the document and the read area.

19 Claims, 4 Drawing Sheets

CURVILINEAR PRESSURE PAD FOR IMPROVED MICR READING AND METHOD

CROSS-REFERENCE TO RELATED APPLICATIONS

Related subject matter may be found in the following commonly assigned, co-pending U.S. patent applications, both of which are hereby incorporated by reference herein:

(1) Ser. No. 08/781,771, entitled "Check Flipper for Point of Sale Printer and Method Therefor" by Richard H. Harris, et al., which is filed concurrently herewith; and (2) Ser. No. 08/781,770, entitled "A Document Feed Roller Opener and Method Therefor" by Richard H. Harris, et al., which is also filed concurrently herewith.

TECHNICAL FIELD OF THE INVENTION

The invention is drawn to the field of character recognition readers in general and specifically to character readers requiring the capability to read magnetic ink characters printed on documents having varying thicknesses and other physical characteristics.

BACKGROUND INFORMATION

In ongoing attempts to provide more efficient and convenient service to customers, many retailers have begun to use "point of sale check printers" to reduce the time required for a customer to manually fill out and sign a check. Most people have encountered delays at checkout lines when another customer waits until all of his or her items are checked or scanned to begin to fill out a check for the total purchase. Faster service is provided if the retailer uses a point of sale check printer. A point of sale check printer automatically enters information such as the date, amount of purchase and the name of the retail establishment in the proper spaces on a check, leaving only the signature line blank for the customer to sign. The process of paying by check is therefore made similar to a purchase by credit card, in which the date, the amount of the sale and the name of the retail establishment are provided for the customer, who then needs only to sign a receipt to complete the transaction.

It is known in the art to encode data on a check with Magnetic Ink Character Recognition ("MICR") technology. In MICR technology, ferromagnetic indicia, or "magnetic ink" is used to print the customer's account number, a number identifying the bank, and the check number on each check. In the typical embodiment, alphanumeric characters are printed on the front face of a check with magnetic ink. The ferromagnetic particles in the magnetic ink are capable of holding a magnetic charge. Accordingly, when the characters are brought into proximity to a magnet, the magnetic ink is magnetically charged. The magnetically charged characters are then readable by a MICR reader. MICR readers read this information, for example, during the check clearing process to insure the proper account is charged with the amount for which the check is drawn.

MICR readers consist of a magnetic read head, a magnet, a device to advance the check (or other document printed with magnetic ink) past the read head and the magnet, and a device for holding the check or other document in proper relation to the read head. The read head typically has a curved surface and contains an active area, which is a narrow gap along the surface of the read head. Various approaches have been taken to keep documents in proper contact with the read head, including rollers, flat guides and high friction pads.

For example, in U.S. Pat. No. 3,801,804, by Von Glahan, et al., a mechanism comprising a rotating circular read head and a serpentine belt held against an arc of a rotating drum is disclosed. The methodology implemented in this patent requires several bearings along with the belt itself which are all susceptible to failure. No provision is made for documents having different thicknesses or stiffnesses. Further, the document being read must contact the belt and the drum throughout the extent of the contact area therebetween. The belt is always in contact with the roller, even with document present. In U.S. Pat. No. 4,031,359, by Christou et al., A Straightline Mechanism for Reading Documents, is disclosed. In this apparatus, no provision is made for holding a document securely against the read head to improve the efficiency of the reader. Further, the pressure pad disclosed within this patent is in the form of a metallic spring that will only permit a document to be fed through the apparatus in one direction. In U.S. Pat. No. 5,442,427 by Kogan, a magnetic transducer pressure pad is disclosed. The pressure pad is a flexible belt made of elastomeric material. The belt is spring-loaded against a read head and the pressure pad must contact the read head for the system to work. In U.S. Pat. No. 5,309,302 by Vollmann, is disclosed. A pressure pad is contained within a removable cassette. A read head is provided external to the cassette. The contact with a read head is aided by a spring-loaded felt pad with metal guides to advance and bias the pressure pad against the read head in a direction perpendicular to the path of travel of the tape. Further, no attempt has been made in this patent to conform the shape of the pressure pad to the read head.

Current point of sale check printers contain MICR readers for reading MICR encoding on the check and transmitting the encoded data to credit verification agencies. After the information regarding the customer's bank and account number is transmitted to the credit verification agency, a decision may then be made by the retailer whether to accept the presented check. The verification step is not necessary, as some point of sale check printers merely read and record the MICR-encoded data. After the MICR is read and any verification or approval completed, the back of the check is endorsed or franked.

Although the physical locations for endorsement and printing purchase information on checks have become somewhat standardized in recent years, other physical characteristics of checks such as their thickness and stiffness continue to vary widely from one customer's check to the next. Checks having differing widths may have MICR-encoded data in different relative positons. Checks to be read by a MICR reader may have creases or wrinkles from having been folded. Further, differing atmospheric conditions such as humidity levels may cause paper checks to respond differently inside a point of sale check printer. Finally, the printing in magnetic ink on a check may vary widely, such that one check may have a substantial quantity of magnetic ink and the next may have a lesser or even insufficient quantity of ink, making reading of the magnetic ink information difficult unless the check is held in close proximity to the read head.

What is needed is a means for reliable reading of MICR characters on checks and other documents having a variety of physical characteristics and under a variety of physical conditions.

SUMMARY OF THE INVENTION

A reader having a path along which a document is advanced and retracted, is provided with a stationary read head for reading a document and a pressure pad for urging the document towards the read head. The pressure pad is biased toward the read head and rotatably retractable away from the read head. A document is inserted into a reader containing a curved read head and an oppositely curved nesting pressure pad and guided therebetween. As the document is advanced or retracted past the read head, the pressure pad urges the document to conform to the shape of the read head, improving the area of contact of the document and the read head.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

In the following description, well known elements are presented without detailed description in order not to obscure the invention in unnecessary detail. For the most part, details unnecessary to obtain a complete understanding of the present invention have been omitted in as much as such details are within the skills of persons of ordinary skill in the relevant art.

Figure 1:
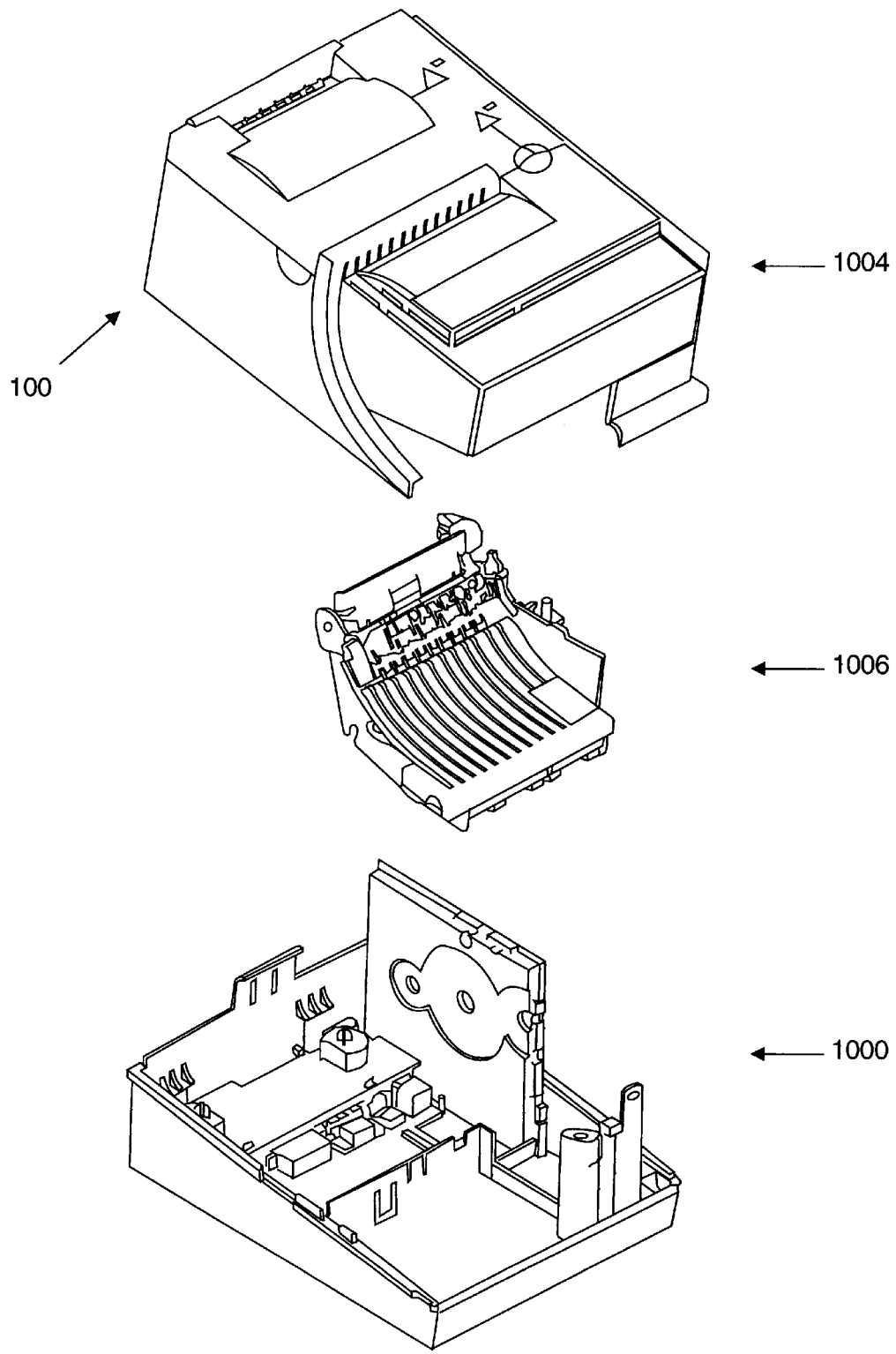
FIG. 1 is an illustration of a point of sale check printer which uses a MICR reader subassembly in accordance with one embodiment of the present invention.

There is illustrated in FIG. 1 a view of a point of sale check printer assembly 100 having an MICR reader in accordance with one embodiment of the present invention. Upper housing 100a covers print head and check flipper subassembly 100b. Lower housing 100c provides additional support, and contains logic and control circuits well known in the data processing art.

Figure 2:
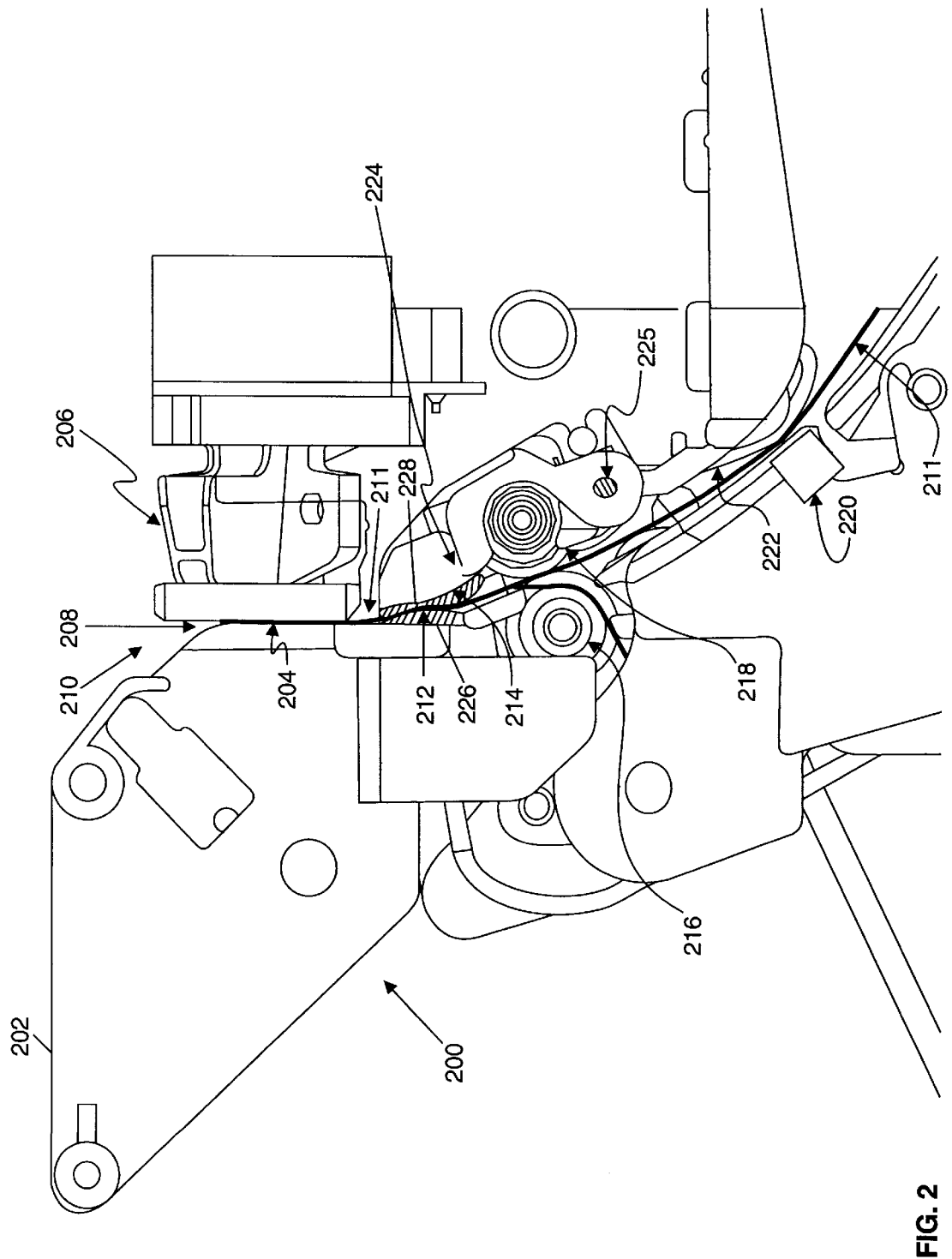
FIG. 2 is an internal view of the point of sale check printer of FIG. 1, revealing a MICR reader subassembly in accordance with one embodiment of the present invention.

There is illustrated in FIG. 2 an interior view of MICR reader subassembly 200 of point of sale printer assembly 100. MICR reader subassembly has platen 202 and print surface 204. Print head 206 is opposite print surface 204. Print head 206 and print surface 204 of platen 202 define document entrance 208. Paper path 210 is defined by document entrance 208, read head 212 and pressure pad 214, first feed roller 216 and second feed roller 218, and magnet 220 and surface 222. Document entrance 208 is a first point along paper path 210. Paper path 210 is best understood by reference to check 211, which in FIG. 2 is inserted in paper path 210. Check 211 is illustrated in FIG. 2 with its leading edge extending beyond magnet 220 and surface 222, and its trailing edge between print head 206 and print surface 204. Check 211 has a front face oriented towards print surface 204, read head 212, and magnet 220 in one embodiment of the present invention. Various operations and mechanisms are located at points along paper path 210, as will be subsequently described herein.

The leading edge of a check having a front face is inserted in document entrance 208. As the check is inserted into document entrance 208, it passes between read head 212 and pressure pad 214 until the leading edge of the check reaches first and second feed rollers 216 and 218 respectively. First and second feed rollers 216 and 218 are in contact with each other, and preferably have circumferential surfaces of rubber, soft plastic, or the like. It should be understood by those with skill in the art, however, that additional materials may be used to implement first and second feed rollers 216 and 218. As first and second feed rollers 216 and 218 rotate in a forward direction, the check is drawn between first and second feed rollers 216 and 218 and moved further along paper path 210.

As illustrated in FIG. 2, during the forward direction rotation of first and second feed rollers 216 and 218, first feed roller 216 rotates clockwise and second feed roller 218 rotates counterclockwise. Power to rotate first and second feed rollers 216 and 218 is provided by well known means, such as an electric motor connected to an axle or drive shaft of first feed roller 216 and/or second feed roller 218 (motor is not shown). The operation of an electric motor in both the forward and the reverse direction, along with the control mechanism and circuitry to reverse such a motor is well known in the art and will not be described in greater detail herein.

As the check is advanced along paper path 210, information printed in magnetic ink on the face of the check is magnetized by magnet 220. After the magnetic ink is magnetized, first and second feed rollers 216 and 218 are reversed, retracting the check along paper path 210 towards document entrance 208. It should be understood that the various sensors, timers and/or controls necessary to provide a signal to a controller to start, stop, or reverse the rotation of first and second feed rollers 216 and 218 are well known in the art and will not be described in greater detail herein.

As the check is retracted along paper path 210 by first and second feed rollers 216 and 218, it is pushed between read head 212 and pressure pad 214. Pressure pad 214 is held by holder 224. Holder 224 is pivotally attached to MICR reader subassembly 200 by pin 225. Holder 224 is biased in the counterclockwise direction, as viewed in FIG. 2, towards read head 212, but is rotatable in the clockwise direction, away from read head 212 and pressure pad 214. Holder 224's counterclockwise rotation is limited by read head 212.

Read head 212 has a convex surface 226 and pressure pad 214 includes a concave surface 228. The curvature of convex surface 226 is substantially equal to the curvature of concave surface 228, such that the bias of holder 224 counterclockwise tends to close off space between read head 212 and pressure pad 214. Further, should any item be placed between read head 212 and pressure pad 214, the bias of holder 224 will tend to force such item towards read head 212 and cause it to assume the curvature of read head 212. With the check urged against pressure pad 214, the area of contact between the check read head 212 will be maximized, increasing the efficiency of read head 212.

Figure 3:
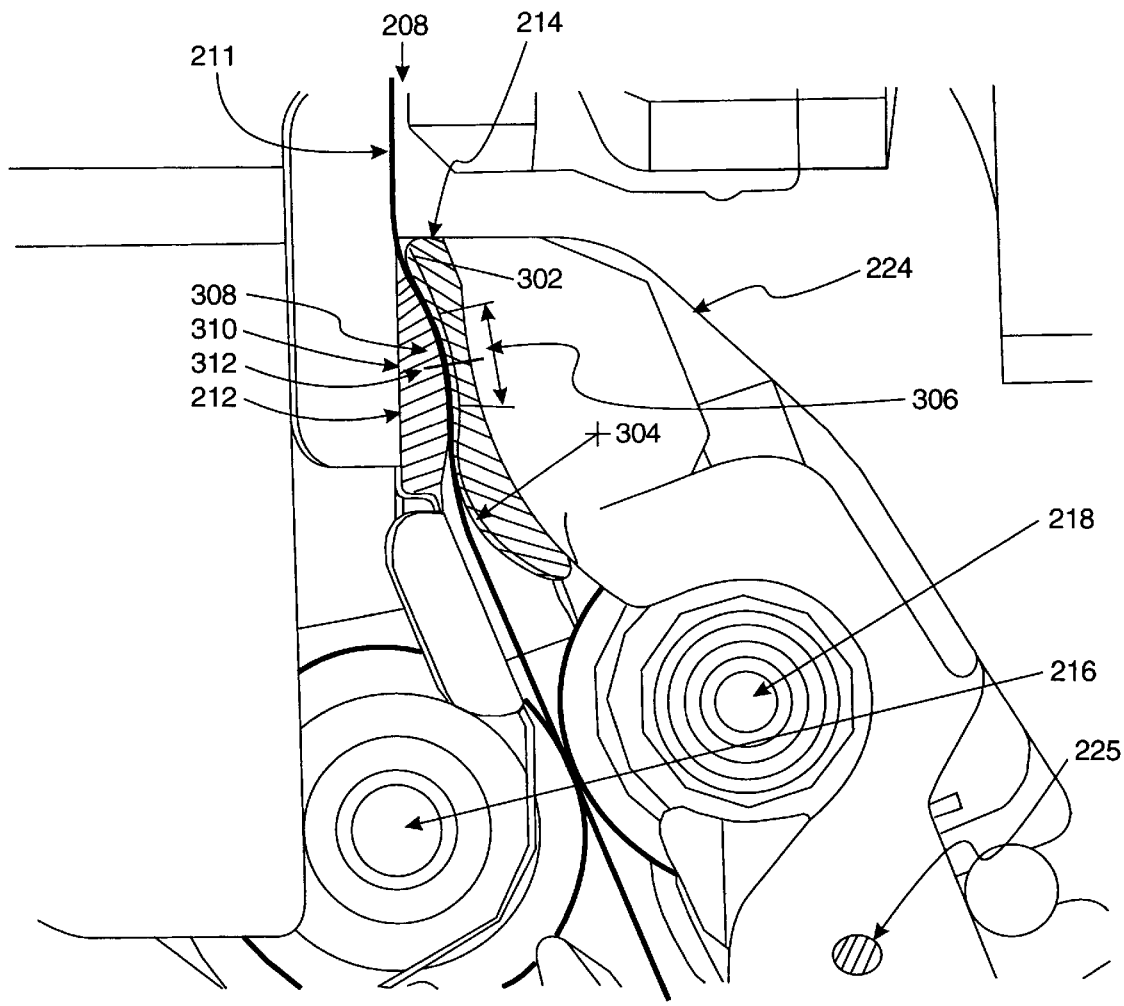
FIG. 3 is a detailed internal view of the point of sale check printer of FIG. 1, providing greater detail of MICR reader subassembly, specifically the read head and pressure pad.

Turning now to FIG. 3, a detailed view of MICR reader subassembly 200 is illustrated, with more detail provided in particular of read head 212 and pressure pad 214. Pressure pad 214 is preferably made of low-wear/low-friction injection-molded plastic. Additionally, it should be noted that other materials such as metal or composites may be used to form pressure pad 214. Pressure pad also has first radius 302 and second radius 304. First radius is rear document entrance 208 and second radius 304 is near first and second feed roller 216 and 218. First radius 302 and second radius 304 both create convex surfaces, with first radius 302 preferably shorter than second radius 304. Read head 212 has convex surface 226 across its entire surface.

Concave surface 228 and convex surface 226 define contact area 306. A check held between read head 212 and pressure pad 214 will be held against read head 212 throughout contact area 306. Check 211 is tightly constrained as it passes between read head 212 and pressure pad 214 and is therefore less likely to buckle as it is advanced therebetween.

Apex 308 of read head 212 is preferably coincident with apex 310 of contact area 306. Located at apex 308 is read head gap 312. Magnetized characters printed in magnetic ink and held in close contact with read head gap 312 as check 211 is driven across read head 212 allows read head 212 to decode the characters into usable information. It should be understood that the actual decoding process of read head 212 is well known in the art and will not be described further herein. It should also be understood that the reading and decoding operation of read head 212 is benefitted by close contact between read head gap 312 and the item being read because the likelihood of "noise" or external information being picked up by or transmitted into read head gap 312 is lessened if the item being read is held tightly against the read head 212. Further, in the case of an MICR reader, holding MICR characters close to the read head 212 provides a stronger magnetic signal at read head 212. Check 211 is shown curved around read head 212 by the force of holder 224 biasing pressure pad 214 against read head 212.

As check 211 is inserted through document entrance 208 into paper path 210, it is guided between read head 212 and pressure pad 214 by the opposing convex areas of convex surface 226 and first radius 302. While pressure pad 214 and holder 224 are biased against read head 212, the bias is not strong enough to close off paper path 210 and prevent check 211 from passing between read head 212 and pressure pad 214, rather, holder 224 rotates a slight amount in the clockwise direction sufficient to allow check 211 to pass therethrough.

After check 211 passes magnet 220, magnetizing the MICR characters, first and second feed rollers 216 and 218 turn in the reverse direction to redirect check 211 back along paper path 210. Check 211 is guided between read head 212 and pressure pad 214 by the opposing convex areas of convex surface 226 and second radius 304. While pressure pad 214 and holder 224 are biased against read head 212, the bias is not strong enough to close off paper path 210 and prevent check 211 from passing between read head 212 and pressure pad 214, rather holder 224 rotates clockwise a slight amount in response to check 211 being pushed between read head 212 and pressure pad 214 to allow check 211 to pass through.

As check 211 is advanced past read head 212 and read head gap 312, the magnetized MICR characters are read and decoded by well known means.

Figure 4:
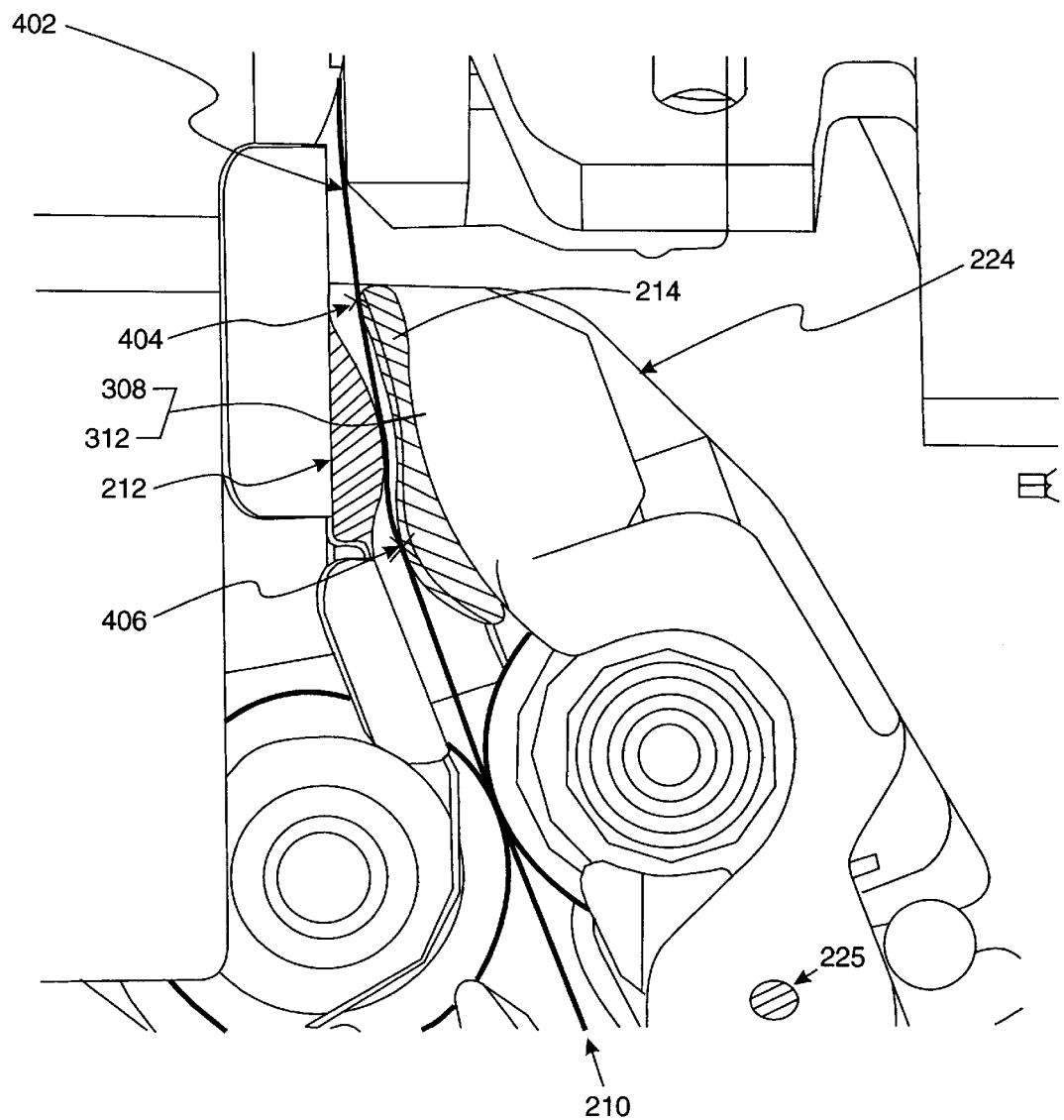
FIG. 4 is another detailed internal view of the point of sale check printer of FIG. 1, providing greater detail of the read head and pressure pad as they are separated in response to the insertion of a stiffer document than that shown in FIG. 3.

There is illustrated in FIG. 4 a view of MICR reader subassembly 200 into which check 402 has been inserted into paper path 210. Check 402 has a higher degree of stiffness than check 211 (not shown) and is therefore less likely to conform to the shape of convex surface 226 at the urging of pressure pad 214 and holder 224. A stiffer check causes pressure pad 214 and holder 224 to pivot away from read head 212. As a result, check 402 contacts pressure pad 214 at first point 404 and second point 406, yet still engages read head 212 across substantially all of contact area 306 (not shown in FIG. 4). Even though check 402 does not conform to the entire surface of convex surface 226, check 402 is still held in close contact with apex of read head 308 and read head gap 312. First point 404 is located on first radius 302 at or near the apex of first radius, and second point 406 is located on second radius 304 at or near the apex of second radius 304. As the stiffer check 402 is advanced between read head 212 and pressure pad 214, holder 224 rotates clockwise to a greater degree than when thinner check 211 is read.

First and second points 404 and 406 may wear, as first and second points 404 and 406 are in contact with all checks regardless of their thickness. Wear of first and second points 404 and 406 will cause the area of contact of the check and read head 212 to decrease. A considerable amount of wear of first and second points 404 and 406 would have to occur, however, before a check would no longer be held in sufficient contact with apex 308 and read head gap 312 to allow the MICR characters to be read.

A MICR reader subassembly in accordance with the present invention, therefore, provides a greater degree of reliability and readability of MICR characters printed on a variety of checks. Thin checks are tightly constrained as they are advance beyond the reader and thereby less likely to buckle or become jammed. Stiffer checks are also held in contact with the read area as the pressure pad and holder yield to their presence. Furthermore, pressure pad 214 is replaceable in the unlikely event it wears to the point where it no longer provides sufficient contact with read head 212. Finally, pressure pad and holder 224 are preferably made of low cost plastic, making their replacement a low cost consideration. It should be understood by those with skill in the art, however, that other materials may be used to vary pressure pad 214 and holder 224, such as metal or composites.

While preferred embodiments of the invention have been shown and described, it will be apparent to those skilled in the art that the conception and the specific embodiments disclosed may be readily utilized as a basis for modifying or designing other structures for carrying out the same purpose as the present invention. As one example, the reader described herein could also contain an optical read head for optically reading information printed on checks rather than an MICR reader. The efficiency of an optical reader would also be increased by holding the check in close proximity to the read head using the features of the invention described herein. It should also be understood that documents other than checks are suitable for use with the invention, and that various sizes of documents and checks may be used in the invention, according to the physical dimensions of the apparatus in which the invention is installed. It should also be realized by those skilled in the art that such equivalent constructions do not depart from the spirit and scope of the invention as set forth in the appended claims.

What is claimed is:

1. A reader, comprising:
    a path along which a document may be advanced and retracted;
    a stationary read head for reading a document disposed along said path; and
    a pressure pad for urging a document towards said read head, said pressure pad biased toward said read head and rotatably retractable away from said read head,
    wherein said read head has a convex surface which has a first curvature defining a first arc, and wherein said pressure pad has a concave surface which has a second curvature defining a second arc, and wherein the first arc is longer than the second arc of said concave surface of said pressure pad.

2. The reader of claim 1, further comprising:
    a holder for mounting said pressure pad, wherein said first curvature and said second curvature are substantially equal and wherein substantially all of said concave surface contacts said convex surface when said holder biases said pressure pad towards said read head.

3. The reader of claim 2, wherein said read head has an apex medially located along said first curvature and defining a gap located at said apex.

4. The reader of claim 3, further comprising a magnet disposed along said path, wherein said document is a check upon which information has been printed with ferromagnetic indicia and wherein said reader reads information printed in ferromagnetic indicia.

5. The reader of claim 3, wherein said reader is an optical reader.

6. The reader of claim 2, wherein said pressure pad further comprises a first convex surface and second convex surface adjacent said concave surface, said first convex surface opposite said concave surface from said second convex surface.

7. A reader, comprising:
   a read head;
   an opposing pressure pad, wherein a path is between the read head and the opposing pressure pad;
   a pivot axis perpendicular to said paper path; and
   a holder rotatably mounted about said pivot axis, said pressure pad mounted to said holder such that said paper path is blocked as said holder rotates said pressure pad towards said read head, said paper path is opened when said holder rotates said pressure pad away from said read head, and wherein said holder is biased toward said read head,
   wherein said read head has a first convex surface having a curvature defining a first arc, said pressure pad has a concave surface having a second curvature defining a second arc, said pressure pad has a second convex surface and a third convex surface adjacent said concave surface, said second convex surface opposite said concave surface from said third convex surface, said second convex surface of said pressure pad having a third curvature defining a third arc, and said third convex surface of said pressure pad having a fourth curvature defining a fourth arc, and
   wherein said concave surface contacts said first convex surface when said holder biases said pressure pad towards said read head.

8. The reader of claim 7, wherein said paper path is opened as a document is inserted between said first convex surface of read head and said concave surface of said pressure pad.

9. The reader of claim 8, wherein said first curvature of said first convex surface and said second curvature of said concave surface are substantially equal, such that as said holder biases said pressure pad towards said read head, substantially all of said concave surface contacts said first convex surface.

10. The reader of claim 9, further comprising a magnet disposed along said paper path and wherein said document is a check upon which information is printed with ferromagnetic indicia.

11. The reader of claim 10, wherein said pivot axis is disposed along said paper path between said pressure pad and said magnet.

12. The reader of claim 7, wherein the third curvature of said second convex surface has a shorter radius than the fourth curvature of said third convex surface.

13. A reader, comprising:
   a path along which a document is advanced and retracted;
   a stationary read head disposed along said path, said read head having an arcuate convex surface having a first radius; and
   a pressure pad having an arcuate concave surface having a second radius,
   wherein said first radius of said arcuate convex surface and said second radius of said arcuate concave surface are substantially equal,
   wherein said pressure pad is biased toward said read head for urging a document to conform to said arcuate convex surface as said document is advanced and retracted past said read head, and
   wherein said concave surface contacts said arcuate convex surface when said holder biases said pressure pad towards said read head.

14. The reader of claim 13, wherein said pressure pad separates from said read head by a rotational motion, wherein said rotational motion has an axis of rotation located adjacent to said path.

15. The reader of claim 14, further comprising a magnet disposed along said path and wherein said document contains information printed thereupon in ferromagnetic indicia.

16. A method of reading information on a document, comprising the steps of:
   inserting a document having a thickness and containing printed information into a reader having a read head, a pressure pad, and a holder, said read head having a first convex surface, said pressure pad having a second convex surface capable of contacting said convex surface of said read head, a first concave surface, and a third convex surface, said pressure pad mounted in said holder, said holder biased toward said read head;
   guiding said document between said second convex surface of said pressure pad and said read head to move said pressure pad away from said read head;
   advancing said document between said first concave surface of said pressure pad and said read head, said holder and said pressure pad urging said document to conform to the shape of said first convex surface of said read head, to allow information printed on said document to be read by said read head; and
   further advancing said document between said third convex surface of said pressure pad and said read head.

17. The method of claim 16, further comprising the steps of retracting said document between said pressure pad and said read head, and removing said document from said second convex surface of said pressure pad and said read head.

18. The method of claim 17, further comprising the steps of providing a magnet having a face and wherein information is printed on said document is printed with ferromagnetic indicia;
   advancing said document across the face of said magnet to magnetize said ferromagnetic indicia; and
   reading said magnetized document by said read head.

19. The method of claim 18, wherein said document is a check and said magnet is located such that said check will pass between said read head and said pressure pad before said check is advanced across the face of said magnet; further comprising the step of: retracting said check after said check has advanced across the face of said magnet.

* * * * *